United States Patent
Quarre

[19]

[11] Patent Number: 5,899,437
[45] Date of Patent: May 4, 1999

[54] CAM ACTUATED VALVE

[75] Inventor: Steven C. Quarre, Redmond, Wash.

[73] Assignee: Applied Precision, Inc., Issaquah, Wash.

[21] Appl. No.: 08/989,696

[22] Filed: Dec. 12, 1997

[51] Int. Cl.⁶ .......................... F16K 31/04; F16K 31/524
[52] U.S. Cl. ....................................... 251/129.2; 251/251
[58] Field of Search ................................ 251/129.2, 331, 251/251, 252, 129.11

[56] References Cited

U.S. PATENT DOCUMENTS 3,614,057 10/1971 Hospe .................................. 251/251 X
4,448,391 5/1984 Young .................................. 251/251 X
4,508,143 4/1985 Ogasawara ........................... 251/251 X

*Primary Examiner*—Kevin Lee
*Attorney, Agent, or Firm*—Richardson & Folise

[57] ABSTRACT

A cam actuated valve method and apparatus utilize an electronically controlled stepper motor driving a cam. A diaphragm type low flow, high accuracy diaphragm valve is positioned off axis with respect to the cam. A transmission translates linear motion of the cam to the valve diaphragm. High accuracy is maintained because the transmission is preloaded by pressure within the valve and the valve diaphragm.

13 Claims, 3 Drawing Sheets

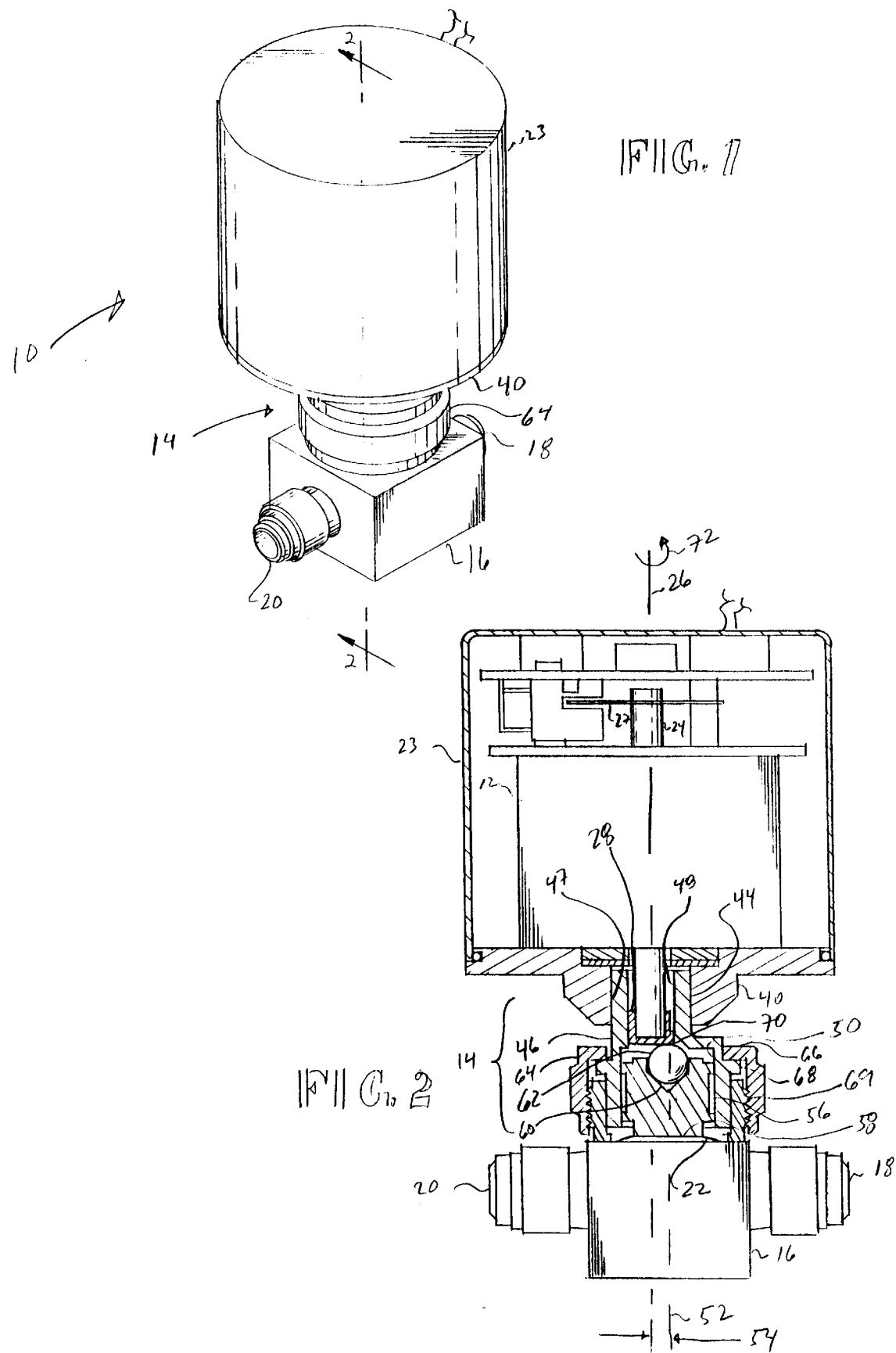

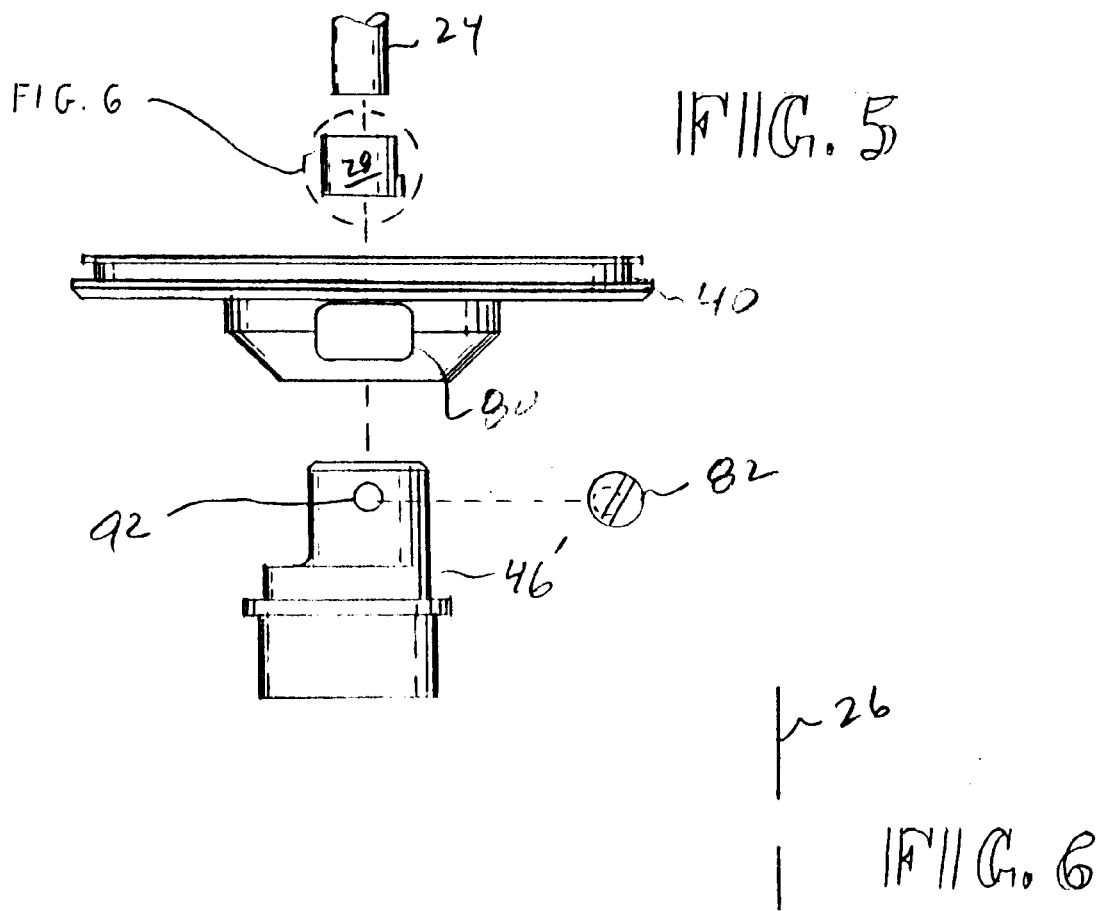

CAM ACTUATED VALVE

TECHNICAL FIELD

The invention relates to methods and apparatus for electronically controlling fluid valves. More specifically, the invention relates to a method and apparatus for precisely controlling gas flow valves in low volume, high accuracy applications.

BACKGROUND OF THE INVENTION

High accuracy, low flow valves are used in a variety of applications. Such applications include high pressure gas chromatography, fractional distillation, and the manufacture of semi-conductor wafers. The manufacture of semi-conductor wafers presents specific problems in managing gas flow in epitaxal reactors which manufacture today's semi-conductor products. As is well known by those of ordinary skill in the art, a silicon wafer for a semi-conductor device is built up in layers from a semi-conductor wafer substrate, typically manufactured from silicon dioxide. The degree to which the silicon dioxide conducts electricity in the presence of an electrical field is determined by the quantity of "impurities" which are driven into the surface of the substrate. These "impurities" are in fact desirable elements and their presence or absence must be carefully controlled. Furthermore, the circuits which are imbedded in the semi-conductor wafer are deposited in layers on top of the substrate. Subsequent etching and redeposition steps, including a final metalization layer results in a complex circuit imbedded in the semi-conductor wafer.

All of the above described deposition steps are typically accomplished by chemical vapor deposition in a high temperature oven better known as an epitaxal reactor. In all cases, the different layers are deposited by vapor deposition from materials in a gaseous state. In order to control the deposition, and to more precisely control the growth of the layers which are built up on the substrate surface the following variables must be carefully controlled: the temperature of the reactor, the flow rate of the selected gas over the substrate, and the time of exposure. It is well known that the degree to which the above steps can be achieved quickly and accurately significantly increases yield thereby reducing the cost of producing a semi-conductor product.

Before the development of the present invention, it was necessary to control the flow of gasses through the epitaxal reactor manually by turning valves connected to an appropriate gas generator such as a pressurized cylinder. In addition to the inaccuracies inherently present in a manual system considering operator variability, it is also known that the epitaxal reactor must be "shut down" while the gas flow valves are adjusted. This time consuming, labor intensive and inherently variable process is one major source of inefficiency in the semi-conductor manufacturing industry.

Thus, a need exists for a high accuracy, automatic gas flow control valve which can be operated under electronic or computer control so as to eliminate the deficiencies noted above.

SUMMARY OF THE INVENTION

It is therefore an object of the present invention to provide a method for automatically and electronically controlling a low flow, high accuracy gas valve.

It is a further object of the invention to achieve the above object with an apparatus capable of operating a high accuracy, low flow diaphragm type gas flow valve.

It is yet another object of the invention to achieve the above objects with a transmission for coupling an electronic, stepper motor to a conventional, high accuracy low flow diaphragm type gas flow valve.

It is still another object of the invention to provide a method for adjusting the transmission for coupling the stepper motor to the gas flow valve.

The invention achieves these, and other objects and advantages which will become apparent from the description which follows, by providing a cam operated valve employing a linearly actuated low flow, high accuracy valve. An electronically controlled rotating device operates a rotatable cam having a cam surface positioned to actuate the linearly actuated valve. The rotational device can be operated under computer control or electronically with appropriate manual controls.

In a preferred embodiment of the invention, a transmission is interposed between the rotatable cam and the linearly actuated valve. The transmission provides a low friction bearing surface for contact with the cam, and a working surface for actuating the valve. The transmission includes a reciprocatable piston or plunger which reciprocates within a housing to actuate the valve. The housing can be used to interconnect the rotating device with the valve. In an alternate preferred embodiment, a mechanism is provided for adjusting and calibrating the transmission.

BRIEF DESCRIPTION OF THE DRAWINGS

FIG. 1 is an environmental view of the invention.

FIG. 2 is an enlarged, partial, elevational view of the working parts of the preferred embodiment shown in FIG. 1.

FIG. 5 is an exploded, elevational view of the alternate, preferred embodiment.

FIG. 6 is an enlarged, elevational view of the cam of the invention.

DETAILED DESCRIPTION OF THE PREFERRED EMBODIMENTS

Figure 3:
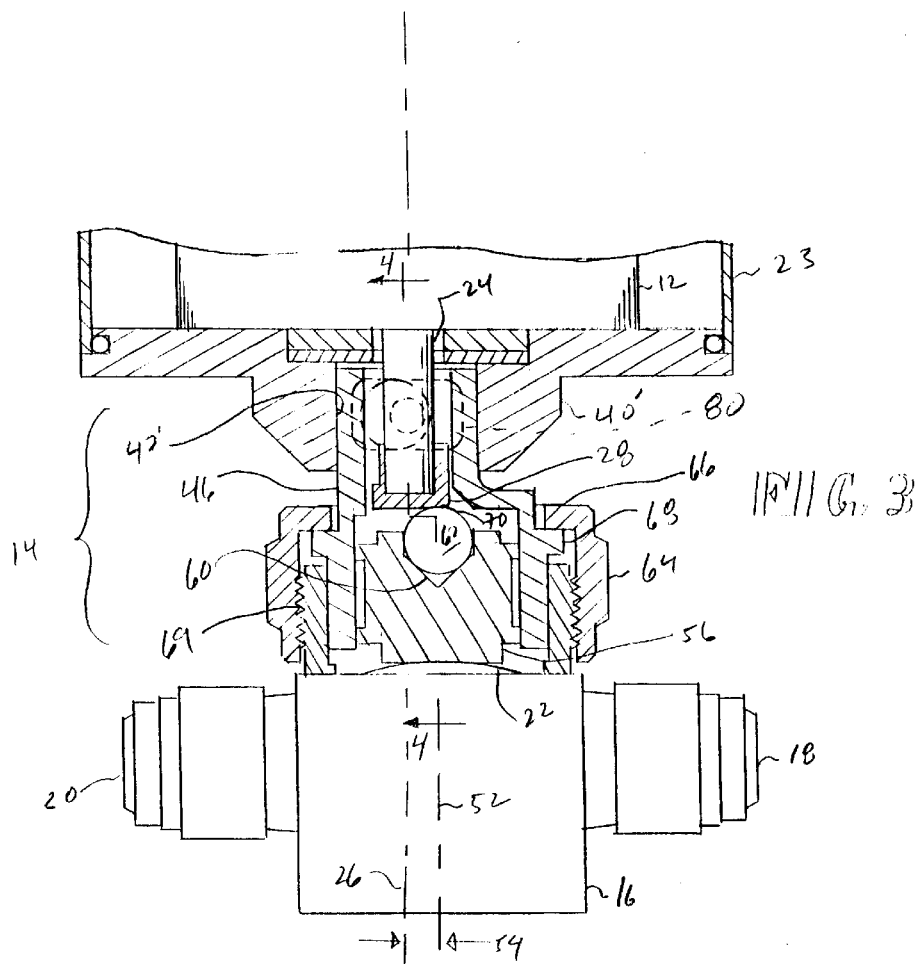
FIG. 3 is an enlarged, partial elevational view of an alternate embodiment of a transmission housing for the invention.
Figure 4:
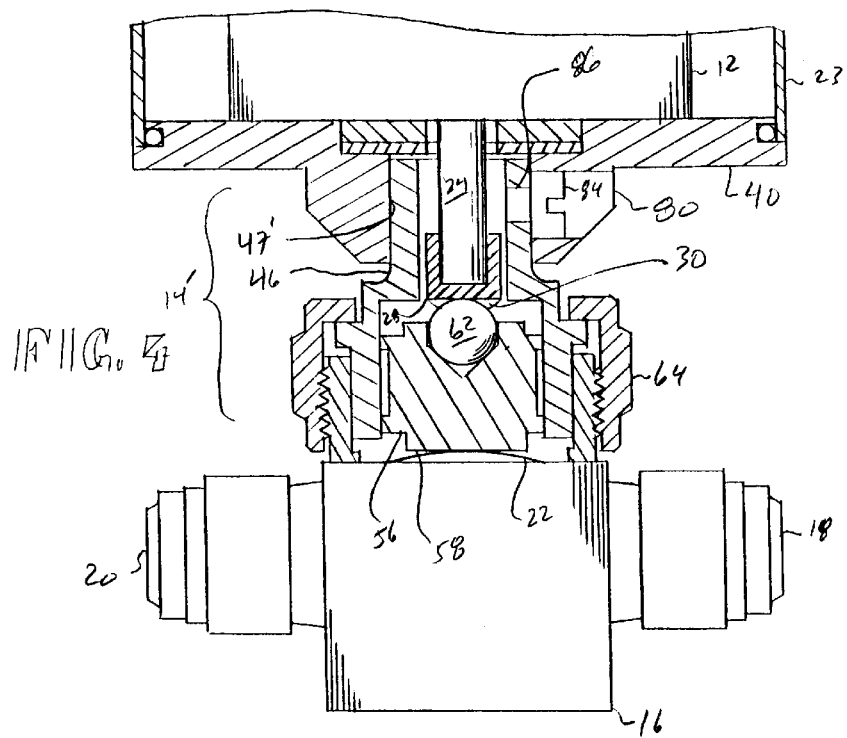
FIG. 4 is a sectional view taken along line 4—4 of FIG. 3.

A cam actuated valve, in accordance with the principals of the invention is generally indicated at reference numeral 10 in FIGS. 1 and 2. The invention has three major components: an electronically controlled stepper motor 12, a transmission generally indicated at bracket 14; and, in the preferred embodiment a diaphragm type low flow, high accuracy valve 16. The valve has an inlet port 18 and an outlet port 20 with appropriate couplers shown thereon for connecting to hoses or the like of a gas supply and of a gas using equipment, respectively. The gas using equipment can be a variety of equipment including an epitaxal reactor.

The valve 16 has an external diaphragm 22 which controls restriction inside the valve to the flow of gas. An appropriate valve is a Fujikin model FUDDFM-71G-6.35 diaphragm valve, manufactured in Japan and distributed by Fujikin of America, Inc., Santa Clara, Calif. The valve has a typical flow range of 0 to 30 standard liters per minute at a source pressure of 50 pounds per square inch but is adjusted to a range of 3 to 30 standard liters per minute as will be described further below.

The invention 10 controls the valve 16 through the use of the electronic stepper motor 12 contained in a motor housing 23. This motor has a drive shaft 24 10 which rotates about a drive or cam rotation axis 26 in a manner well known to those of ordinary skill in the art. An appropriate motor is a model PK243, 200 step, 2 phase stepping motor manufactured in Japan, and distributed in the United States by Oriental Motor USA Corp., Santa Clara, Calif. The operation of motors of this type are well known to those of ordinary skill in this art. It is sufficient for the purposes of this disclosure to describe such a motor as having a rotary encoder 27 which is coupled to the motor drive shaft 24 for position/fault detection purposes under computer or manual electronic control. Motors of this type are fully disclosed and described in U.S. patent application Ser. No. 08/544,309, titled LINEAR MOTION MICRO-POSITIONING APPARATUS AND METHOD which has been assigned to the assignee of the present invention, and the disclosure of which is incorporated herein by reference. Thus, those of ordinary skill in the art will appreciate that other types of rotary drive motors may be employed consistent with the spirit of this disclosure.

The drive shaft 24 of the motor 12 is equipped with a cap 28 having a cam surface 30 on a forward face thereof. The cap 28 is fixed to the drive shaft 24. The cap may also be bonded to the drive shaft with a conventional bonding agent such as an anaerobic adhesive (Loctite 635 Part Bonder). The cam surface 30 is substantially parallel to an axis 26 which defines a cam rotation axis. However, as best seen in FIG. 6 the cam surface is canted with respect to the rotation axis 26 by 1.5°. The surface is substantially planar, exhibiting a maximum pitch 32 (difference between a "low end" and "high end" of the cam surface) of approximately 130 $\mu$m. The cap is preferably made from A2 tool steel, hardened to Rc 62. The motor 16 described above is capable of driving the cap 28 in small angular increments such that the axial travel of the cam surface is approximately 1.3 $\mu$m per motor cardinal step.

The motor 16 is further provided with an adaptor 40 having a threaded circular opening 44 for receiving a bonnet or transmission housing 46. The transmission housing is cooperatively threaded on an external surface 47 thereof to mate with the threads on the adaptor 40. The threads on the external surface 47 are preferably treated with a locking compound such as Loctite to prevent the connection from loosening. The transmission housing defines a first interior cavity 48 having a substantially cylindrical shape and having an axis coincident with the cam rotation axis 26. The first interior cavity 48 has an inner diameter larger than the outer diameter of the cap 28 to permit the free rotation of the cap. The transmission housing 46 defines a second interior cavity 50 also of substantially cylindrical interior shape having an axis substantially coincident with a valve actuation axis 52. The valve actuation axis is substantially perpendicular to the valve diaphragm 22 and is the intended direction for the application of force against the diaphragm. The axes of the first and second cavities are substantially parallel but are offset by approximately 0.10 inch as shown at reference numeral 54 for purposes that will be described in further detail below.

The second internal cavity 50 receives a reciprocatable plunger or piston 56 which has a working surface 58 on one distal end in contact with the diaphragm 22. The other end of the piston has a tapered bore 60 for receipt of a ball bearing 62. The ball bearing is preferably manufactured from hardened, chrome plated steel and has a diameter of 0.25 inch. The ball bearing is preferably received in a press fit in the tapered bore 60 so as to be fixed to the piston 56. The bore 60 has a preferred diameter of slightly smaller than the diameter of the ball bearing for a friction fit. The transmission housing 46 is also provided with a threaded collar 64 having an inwardly depending radial flange 66 for engagement with a radially extending circumferential lip 68 on the transmission housing 46. The collar 64 has internal threads 69 which mate with corresponding threads on the valve 16 to hold the transmission housing against the valve by compression. The collar 64 is preferably tightened to a torque of 52 ft. lbs. (70 N-m) to properly preload the transmission 14 and to seal the diaphragm against valve.

As will be apparent from inspection of FIG. 2, the ball bearing 62 is in contact with the outer perimeter of the cam surface 30 at contact point 70. The cam surface has an outer diameter of approximately 0.280 inches. The contact point is radially displaced approximately 0.10 inch from the cam rotation axis 26.

Therefore, rotation of the drive shaft 24 in a direction such as that shown at reference numeral 72 through 180° will cause the ball bearing 62 and piston 56 to move upwardly with respect to the orientation of FIG. 2. If the drive shaft is rotated beyond 180°, the bearing 60 will begin to move downwardly. The working end 58 of the piston 56 thus depresses, or relieves pressure on the diaphragm 22, according to the direction and degree of rotation of the drive shaft 24. It will be apparent to those of ordinary skill in the art that in order for the diaphragm 22 to move through a maximum deflection due to rotation of the cam surface 30, it is only necessary to rotate the drive shaft through 180°. The working surface 58 of the piston is preferably spheroidal, having a radius of curvature of 0.984 inch so as to minimize stress in the diaphragm 22. Tests performed on an embodiment of the invention constructed in accordance with the above disclosure show that with a linear displacement of the cam surface 30 through approximately 130 $\mu$m, the valve 16 substantially opens and closes in a linear fashion. Considering that the invention as described above has a resolution of approximately 1.3 $\mu$m per motor cardinal step, a high degree of accuracy is possible in the control of the valve 16. It is to be further appreciated that operation of the valve 16 in accordance with the principals of the invention is now possible to totally automate the operation of the valve 16 under computer control in a predictable and repeatable fashion. The accuracy and repeatability of the invention is maintained because pressure within the valve, and the spring load within the diaphragm 22 preload the transmission 14.

An alternate embodiment of the transmission 14' is shown in FIG. 3. In this embodiment the adaptor 40' is provided with a radially directed aperture 80 for receiving an adjustment cam 82. The adjustment cam has a slotted head 84 and an off axis, longitudinally directed shank 86. The shank is adapted for receipt in a bore 88 in the transmission housing 14'. In addition, the outer surface 47' of the transmission housing is smooth and unthreaded as is the contacting inner surface of the adaptor. The purpose of this modified structure is to correlate an index pulse from the rotary encoder 27 with a predetermined gas flow rate through the valve 16. To accomplish this, there are two primary steps. First, a high point on the cam surface 30 must be correlated to an encoder index pulse. The high point on the cam is defined as the point on the cam face that will depress the valve diaphragm 22 to the minimum flow position. Secondly, the transmission 14 must be positioned relative to the adaptor 40' so that a desired flow rate is attained through the valve at the known relative position between the encoder 27 and the cam 28.

The first is accomplished by positioning a machined surface 90 on the cam 28 that is perpendicular to the cam face 30 to index the cam relative to an external tooling reference surface. In this way the high point on the cam face is positioned at a known angular position with respect to the external world on the same tooling reference surface. The motor 12 and encoder 27 are then driven electronically to the index position (noted by the index pulse on the rotary encoder). The motor and encoder are then angularly oriented to the cam tooling reference surface. The result of this operation is that the high point on the cam face and the encoder index pulse will have a known angular orientation between them. Finally, the cam is bonded to the motor shaft, without changing its angular position.

The second step is accomplished by fixing the longitudinal position of the transmission 14' with respect to the adaptor 40' to the valve. This is done by sliding the adaptor (which the motor is attached to) over the transmission. The cam/motor assembly is thus angularly oriented so that the high point on the cam face 30 is coaxial with the ball 62 centerline. The adjustment cam 82 is then inserted through the aperture 80 in the adaptor and journaled into a transmission mounting hole 92. By rotating the slotted head 84 clockwise or counter clockwise, the motor/cam assembly will be translated relative to the valve 22 and transmission 14'. When the cam face 30 is in contact with the ball 62 the result from rotating the adjustment cam is to open or close the valve 22. The valve can then be attached to a gas source coupled to a gas flow meter, and the adjustment cam rotated until the desired flow rate is attained. Note that this flow rate is the minimum flow rate that the valve will achieve, because the cam high point is already in contact with the ball 62. Once in position, an anaerobic adhesive between the adaptor 40 and the outer surface 47 of the transmission 14 will permanently fix the adjusted position. Running the motor 12 (and thus cam 28) clockwise or counter clockwise will open the valve 22 because the ball 62 will be moving off of the high point on the cam face 30.

Those of ordinary skill in the art will contemplate other embodiments utilizing the principals described above with respect to the preferred embodiments. For example, the preferred embodiment discloses a cam surface which is substantially perpendicular to the cam rotation axis 26 (although offset from true perpendicularity by 1.5°). Those of ordinary skill in the art could conceive an arrangement in which the cam surface is substantially parallel to the cam rotation 26 by rotating the motor 12 and drive shaft axis through 90° into or out of the plane of FIG. 2. Therefore, the invention is not to be limited by the above disclosure, but is to be determined in scope by the claims which follow.

I claim:

1. A cam operated valve, comprising:
   a linearly actuated valve having a valve actuation surface defining a substantially perpendicular valve actuation axis;
   a rotatable cam defining a cam rotation axis and having a cam surface thereon positioned to depress the valve actuation surface wherein the cam surface defines a substantially planar surface oriented substantially perpendicular to the cam rotation axis; and, rotation means for rotating the cam about the cam rotation axis through less than 360 degrees.

2. The cam operated valve of claim 1, wherein the substantially planar surface is offset from perpendicularity with respect to the cam rotation axis by approximately 1.5 degrees and wherein a maximum total travel of the cam surface is approximately 130 micrometers.

3. The cam operated valve of claim 1, wherein the valve actuation and cam rotation axes are parallel and offset.

4. The cam operated valve of claim 1, including a transmission interpositioned between the cam surface and the valve actuating surface.

5. The cam operated valve of claim 4, wherein the transmission has a bearing in contact with the cam surface and wherein the bearing is received in a reciprocatable piston, the piston having guide means for positioning a working surface on the piston in contact with the valve actuating surface.

6. The cam operated valve of claim 5, wherein the bearing is a ball bearing and wherein the piston and ball bearing define a working axis coincident with the actuation axis.

7. The cam operated valve of claim 5, wherein the working surface is a section of a spheroid.

8. The cam operated valve of claim 1, wherein the rotation means is an electronic, encoding stepper motor.

9. The cam operated valve of claim 8, including longitudinal adjustment means for adjusting a longitudinal position of the transmission with respect to the rotation means.

10. A cam operated valve, comprising:
    a linearly actuated valve having a valve actuation surface defining a substantially perpendicular valve actuation axis;
    a rotatable cam defining a cam rotation axis substantially parallel to and offset from the valve actuation axis, the cam having a cam surface thereon substantially perpendicular to the cam rotation axis and positioned to depress the valve actuation surface through a transmission interpositioned between the cam surface and the valve actuating surface; and,
    rotation means for rotating the cam about the cam rotation axis through less than 360 degrees.

11. The cam operated valve of claim 10, wherein the cam surface is offset from perpendicularity with respect to the cam axis by approximately 1.5 degrees and wherein a maximum total travel of the cam surface is approximately 130 micrometers.

12. The cam operated valve of claim 10, wherein the transmission has a ball bearing in contact with the cam surface and wherein the ball bearing is received in a reciprocatable piston, the piston having guide means for positioning a curved working surface of the piston in contact with the valve actuating surface.

13. The cam operated valve of claim 12, including longitudinal adjustment means for adjusting a longitudinal position of the transmission with respect to the rotation means.

* * * * *